(12) United States Patent
Marsh et al.

(10) Patent No.: US 7,740,300 B2
(45) Date of Patent: Jun. 22, 2010

(54) 2-SIDED GOLF CART ENCLOSURE WITH MAGNETIC DOOR

(76) Inventors: Donald Lee Marsh, 575 Kings Peak Dr., Alpharetta, GA (US) 30022; Robert Spencer Sappington, 15960 Timbergap Crossing, Alpharetta, GA (US) 30004

( * ) Notice: Subject to any disclaimer, the term of this patent is extended or adjusted under 35 U.S.C. 154(b) by 0 days.

(21) Appl. No.: 12/209,147

(22) Filed: Sep. 11, 2008

(65) Prior Publication Data

US 2010/0060027 A1 Mar. 11, 2010

Related U.S. Application Data

(63) Continuation-in-part of application No. 12/017,040, filed on Jan. 20, 2008.

(51) Int. Cl.
*B60J 11/06* (2006.01)
(52) U.S. Cl. .................... 296/83; 296/77.1
(58) Field of Classification Search ............ 296/77.1, 296/78.1, 83, 84.1, 136.01, 136.07, 136.1–136.13
See application file for complete search history.

(56) References Cited

U.S. PATENT DOCUMENTS

| | | | | |
|---|---|---|---|---|
| 4,966,406 A * | 10/1990 | Karasik et al. | ............... | 296/98 |
| 5,259,656 A * | 11/1993 | Carroll | ................. | 296/77.1 |
| 5,388,881 A * | 2/1995 | Spencer et al. | ............. | 296/77.1 |
| 5,588,690 A * | 12/1996 | Showalter | ................. | 296/77.1 |
| 5,788,317 A * | 8/1998 | Nation | ................. | 296/141 |
| 6,439,637 B1 * | 8/2002 | Tyrer | ................. | 296/79 |
| 6,663,161 B1 * | 12/2003 | Tyrer | ................. | 296/100.11 |
| 6,869,125 B2 * | 3/2005 | Hamm | ................. | 296/83 |
| 6,902,220 B2 * | 6/2005 | Moskos et al. | ................. | 296/79 |
| 6,916,059 B2 * | 7/2005 | Feinberg | ................. | 296/79 |
| 7,093,883 B2 * | 8/2006 | Tyrer | ................. | 296/100.14 |
| 7,210,492 B2 * | 5/2007 | Gerrie et al. | ............. | 135/88.07 |
| 7,213,864 B2 * | 5/2007 | Gasper | ................. | 296/83 |
| 7,354,092 B2 * | 4/2008 | Showalter et al. | .......... | 296/77.1 |
| 7,387,133 B1 * | 6/2008 | True et al. | ................. | 135/88.05 |
| 7,448,666 B2 * | 11/2008 | Tyrer | ................. | 296/100.14 |

* cited by examiner

*Primary Examiner*—Glenn Dayoan
*Assistant Examiner*—Gregory Blankenship

(57) ABSTRACT

An improved portable golf cart enclosure design featuring a top and two sides that wrap around a typical golf cart to protect occupants from wind, rain and cold. The improved enclosure features a roll-on and roll-up design that improves the installation and removal task over traditional golf cart enclosures. Finally, this invention improves ingress and egress through a horizontal swing away magnetic door design.

14 Claims, 26 Drawing Sheets

2-sided cover on Cart View

Typical Golf Cart

2-sided cover on Cart View

2-Sided enclosure Roll-on design Step1

2-Sided enclosure Roll-on design rear attached
Step 2

2-Sided enclosure Roll-on design front attached Step 3

2-sided enclosure roll-on design sides down Step 4

2-sided cover Side / Rear View

2-sided cover Rear Windpanel Attachment View

2-sided cover Rear

2-sided cover Assembled view

Two Sider layout view

Magnetic Door Partial Open Outside View

Magnetic Door Open
Outside View

Magnetic Door partially closed Outside View

Magnetic Door Closed Outside View

2-sided cover on Cart Door Open View

Side Wind Panel Wind wrap around seal

Cutaway view of front top fitted cover attachment

Open Front Windpanel on cutaway cart

Sealed Front Upper Windpanel on cutaway cart

Sealed Front Upper Windpanel and Open Door on cart

Cover Rollup View

Cover Rollup Step 1

Cover Rollup View Step 2

Cover Rollup View Step 3

2-SIDED GOLF CART ENCLOSURE WITH MAGNETIC DOOR

CROSS-REFERENCE TO RELATED APPLICATIONS

This application is a continuation-in-part of U.S. application Ser. No. 12/017,040, filed on Jan. 20, 2008, which is incorporated herein by reference.

U.S. application Ser. No. 12/017,040—Sappington/Marsh—Jan. 20, 2008
U.S. Pat. No. 7,354,092—Showalter—Apr. 8, 2008
U.S. Pat. No. 6,439,637—Tyler—Aug. 27, 2002
U.S. Pat. No. 6,916,059—Feinberg—Jul. 12, 2005
U.S. Pat. No. 5,388,881—Spencer—Feb. 14, 1995
U.S. Pat. No. 4,013,315—West—Mar. 22, 1977
U.S. Pat. No. 5,217,275—Ridge—Jun. 8, 1993
U.S. Pat. No. 5,259,656—Carroll—Nov. 9, 1993

STATEMENT REGARDING FEDERALLY SPONSORED RESEARCH OR DEVELOPMENT

NA

REFERENCE TO SEQUENCE LISTING, A TABLE, OR A COMPUTER PROGRAM LISTING COMPACT DISC APPENDIX

NA

The present invention is for an improved portable golf cart enclosure. This cart enclosure employs a two-sided design that wraps over the golf cart roof and around the cart front and rear to block wind, rain and cold. The cart enclosure sides employ a horizontal swing-away magnetic door design that eliminates zippers. This improved golf cart enclosure is easier to install and remove for storage than current golf cart enclosures.

The two sided golf cart enclosure is constructed of lightweight, water resistant, durable cloth (e.g. nylon, vinyl, polyester). The design employs a durable clear vinyl on the sides and rear that allows cart occupants to see outside the enclosure. The design assumes an existing golf cart windshield for optimum forward visibility. Each side wraps around the existing golf cart front windshield support posts to block wind, rain and cold. In addition, wind panels block wind, rain and cold from above and below the existing golf windshield. A rear wind panel secures the enclosure in the rear, and blocks wind, rain and cold. This rear wind panel easily folds away to allow the use of an existing rear club canopy or alternatively serves as a cover to protect golf clubs from rain if a canopy is not present. The enclosure sides are secured under the golf cart for a reliable connection.

The unique design enables a single person to easily install this enclosure on a golf cart. The rear wind panel is secured to the rear of the cart; the enclosure is rolled over the top and secured to the golf cart roof at the front. Finally the enclosure sides are wrapped under the golf cart frame and around the front windshield supports.

Occupant ingress and egress is facilitated through a door that swings horizontally away on the outside of the side panel towards the front of the cart. The door can be connected to the cart enclosure at the front. The top and rear of the door is secured closed by magnetic strips containing permanent magnets. Each magnetic strip has individual pockets containing permanent magnets.

Since weather conditions may change during a typical round of golf, this design provides the ability to keep doors open for improved airflow. The cart enclosure may have one or more techniques to easily and reliably keep the magnetic door in the open position. One, the cart enclosure may have open connectors (hook and loop, slide-release buckles, hook connectors or other quick attachment method) properly positioned near the cart front support posts. There should be two or three of these connectors to securely hold the door in the open position when the cart is being driven. Second, the door may have cooperating open magnetic strips to hold the door in the open position. Third, the door magnetic strips may be directed to attach to the metal cart front roof support post.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

DETAILED DESCRIPTION OF THE PREFERRED EMBODIMENTS

U.S. patent application Ser. No. 12/017,040 filed Jan. 20, 2008 by Sappington/Marsh (the disclosure of which is hereby incorporated by reference herein), assigned to the assignee of this invention. Specifically the novel feature of a horizontal magnetic swing away golf cart enclosure door.

U.S. Pat. No. 7,354,092 to Showalter describes a soft enclosure panel pocket that enables the front edges of the side panels of a soft enclosure to be rolled up and stowed away under the roof cover. As with most portable soft-sided golf cart enclosures inventions, the inventors have focused on improving the door open rollup technique. The 2Sided Golf Cart Enclosure with Magnetic Door invention described in this application improves ingress and egress with a horizontal swing-away door instead of a rollup approach. Zippers are eliminated and the rollup technique is replaced with a magnetic swing away door.

U.S. Pat. No. 6,439,637 to Tyler describes a four sided cart enclosure that utilizes a door with two vertical zippers. To install, the owner must properly orient the enclosure, and secure this large enclosure over the top of the cart, a cumbersome process especially in high wind conditions. To egress, the occupant must unzip one or both of the zippers and to retain cabin warmth, re-zip to re-close. Since a majority of occupants use only one zipper the top opening is small and difficult to enter and exit. When both zippers are raised the opening is much larger however the occupant must lower both zippers to close off wind, rain and cold. When inside the enclosure, the vision towards the front is clouded, due to the clear vinyl draped over the front cart windshield. The 2Sided Golf Cart Enclosure with Magnetic Door invention described in this application assumes a pre-installed golf cart front windshield, as a result occupants do not need to look through clear vinyl towards the front. In addition, this cover does not use zippers or a storage bag and is designed for a single person to easily install and easily rollup for storage.

U.S. Pat. No. 6,916,059 to Feinberg describes a cart enclosure that employees a curved zippered swing away door. While this is an improvement over vertical zippered doors the occupant must still deal with the inherent unreliability of zippers. Zippers are designed to function in a straight line. Any time a zipper is curved it causes the zipper teeth to be either squeezed closer together or spread further apart at the curves. This curved zipper approach forces the zipper from the track, causes the zipper to stick, and causes excess tension on stitching, which causes the zipper and stitching to separate. The 2Sided Golf Cart Enclosure with Magnetic Door invention described in this application eliminates zippers and is thus more reliable and employs a simpler to open and close magnetic technique.

U.S. Pat. No. 5,388,881 to Spencer describes a cart enclosure that employs doors that are raised from the bottom to enable occupant ingress and egress. While this application does not use zippers, lifting the side panel that is permanently attached to the front and the top of the enclosure, creates an awkward ingress and egress opening. The door is opened by disconnecting an armrest connector and lifting the door to create an opening. The magnetic swing-away door described in this application is a much simpler technique to quickly open or close the enclosure door and keep wind, rain and cold from the enclosure.

U.S. Pat. No. 4,013,315 to West describes a cart enclosure where the side panels are secured to the roof by suction cups and tied to the front and rear panels. Entry and exit is accomplished by untying and retying straps to un-secure and secure the side panels. The side panels in this embodiment do not reach to the cart floorboards and wind, rain and cold can easily enter the enclosure. The 2Sided Golf Cart Enclosure with Magnetic Door invention described in this application provides for a simpler more reliable installation, with easier and quicker ingress and egress.

U.S. Pat. No. 5,217,275 to Ridge describes a four-sided cart enclosure that covers the entire golf cart and golf equipment. Ridge describes a single vertical zipper for ingress and egress that zips to the top of the door, which results in a narrow opening that is very difficult for occupants to enter or exit. The 2Sided Golf Cart Enclosure with Magnetic Door invention described in this application uses less material than a four-sided enclosure, is easier to install and rollup for storage, and features a horizontal swing away magnetic door.

U.S. Pat. No. 5,259,656 to Carroll describes a four-sided cart enclosure that employs a vertical center zipper for normal entry plus a second zipper to allow the sides, front and rear to be rolled up and secured under the roof. This embodiment also has a zipper that unzips towards the top of the door, which results in a small opening that is difficult for occupants to enter or exit. If the side is rolled up it creates a large door, however zippers are again used in this embodiment. The 2Sided Golf Cart Enclosure with Magnetic Door invention described in this application only has two sides versus the four claimed by Carroll. The 2Sided Golf Cart Enclosure with Magnetic Door invention described in this application requires less material by using the existing golf cart windshield and rear club cover canopy, instead of providing all four sides as described by Carroll. This results in a cart enclosure that is lighter, smaller and rolls into a small transportable package, similar to a sleeping bag for storage.

BACKGROUND OF THE INVENTION

This invention relates generally to the field of portable soft golf cart enclosures, specifically to a golf cart enclosure design that easily wraps over the permanent cart roof, around an installed front windshield and adapts to an accessible rear club cover canopy. This design is easier for a person to install, remove and prepare for storage. The invention features a unique door opening technique that quickly and reliably opens and closes to protect the passengers from wind, rain and cold, while also improving entry and exit convenience.

Golf cart enclosures are utilized today to protect the occupants from wind, rain and cold. The enclosures generally cover cart windshields and openings in front, sides and rear with vinyl, cloth or other materials.

Golf carts typically have a hard top roof to protect the occupants from the sunlight. Golf cart enclosures generally attach to or are supported by the cart roof and have side panels that are secured to the body of the cart Golf cart enclosures today are one of two types. One type is installed semi-permanently and remains on throughout the cold weather season. The second type is portable and loosely shaped to fit most cart manufacturers. The portable enclosures tend to be either over-the-roof models with four sides or under-the-roof models with three sides.

Most portable patented golf cart enclosure products in the market today, are four sided and slip over the entire golf cart frame. This process typically requires two people to install and remove for storage and becomes more difficult in high wind conditions.

A second patented design has three sides and attaches under the cart roof using straps or rails. This design requires significant installation time and effort to make the necessary connections and is not intended to be portable.

A third patented design attaches to the roof front support bars and rear roof support bars and is easily removable after a installing a semi-permanent fitting on the front roof support bars.

Most enclosures use zippered openings that typically have a closed end at the top to ensure the zippers can be reliably opened and closed. This closed end results in a very small opening for ingress and egress. The zippers must accommodate different degrees of tension to accommodate the different sizes and shapes of golf cart models, which affects in zipper performance during closing and opening and usually causes zipper failure over time.

Most golf cart enclosures have doors or sides that unzip and roll-up during good weather to enable easier ingress and egress. This vertical roll-up process was implemented to allow for airflow during improved weather and to enable easier ingress and egress.

Golf cart zippers are inherently unreliable. Because zippers are mechanical, they are prone to break, snag and tear. Most portable enclosures when installed can stretch a door side, which adds tension on the zippers and contributes to door zipper failure. The zipper teeth can get out of alignment and fail. Zippers also tend to separate from material over time, due to shrinking, caused by tension and weather. In short, there is a high probability that zippers will jam or fail over time.

Most golf cart enclosures today are sold in a storage bag, which is usually sized and shaped to create a small compact package for shipment and sale. This approach makes it difficult to re-fold the enclosure and place it in the original bag. As a result, most owners dispense with using the storage bag.

Therefore, a small portable golf cart enclosure that is easier to install, remove, and pack for storage and provides an improved method of ingress and egress is desired and needed.

BRIEF SUMMARY OF THE INVENTION

The present invention provides an improved golf cart enclosure design that easily rolls on and off the golf cart and consistently rolls into a compact 'sleeping bag' like bundle for storage to make it uniquely portable. The two-sided design uses less material, producing a cart enclosure that is lighter and smaller than previous three and four sided models, while still blocking wind, rain and cold from the occupants. This design employs an innovative magnetic swing away door that improves ingress and egresses.

OBJECTS AND ADVANTAGES OF INVENTION

To provide a uniquely portable golf cart enclosure that is easier to install and remove for storage To provide a two-sided golf cart enclosure with wrap around design that eliminates wind, rain and cold.

To provide a more reliable golf cart enclosure door that eliminates zippers and improves ingress and egress by occupants.

DETAILED DESCRIPTION OF THE INVENTION

The present invention will now be described in detail.

Figure 1:
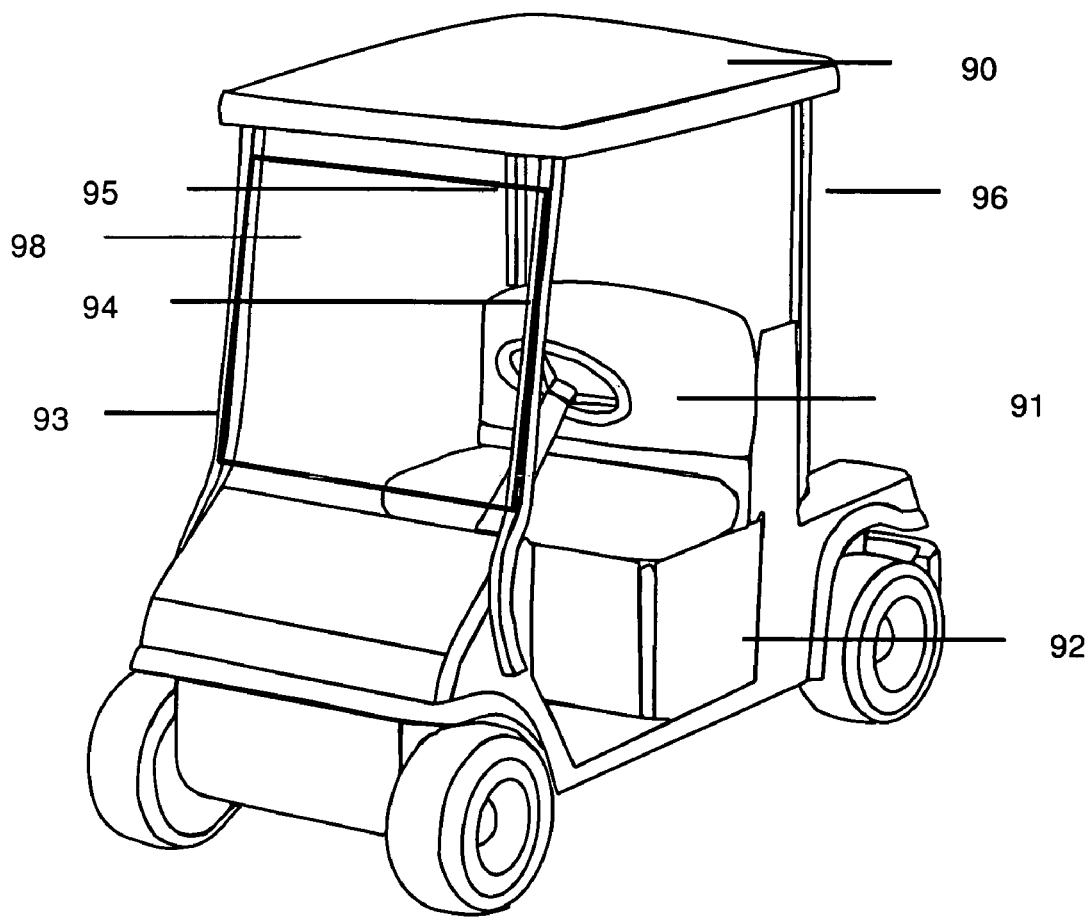
FIG. 1—is a perspective view of a typical golf cart referenced in this application.

FIG. 1—is a drawing of a typical motorized golf cart before a cart enclosure has been attached. The proposed invention is for an improved portable golf cart enclosure that will cover this cart. The typical golf cart has a passenger compartment [91] for sitting passengers, a cart body, [92] cart top [90], (vertically extending and laterally spaced apart front and rear frame members, [93], [94] and [95], [96] respectively, that support cart top [90]. Also shown is a pre-installed golf cart windshield [98].

Figure 2:
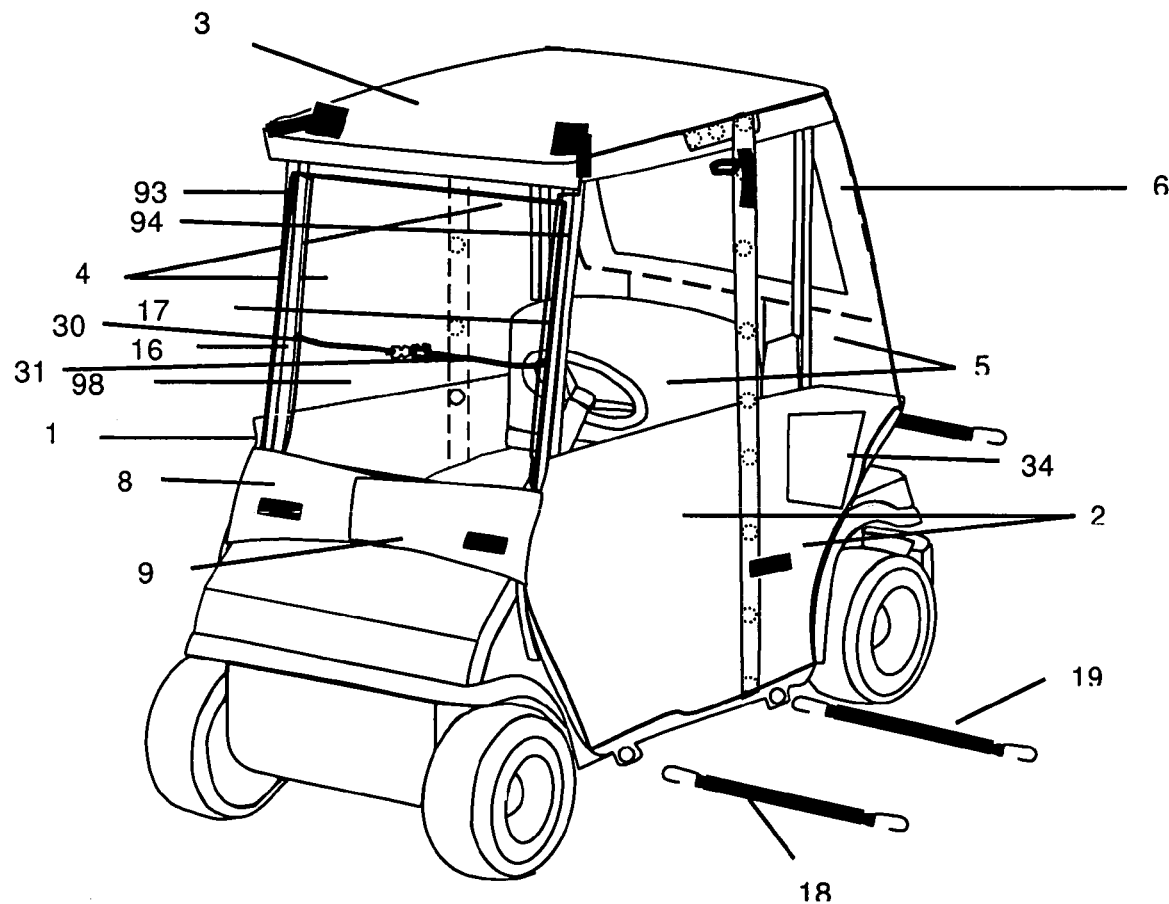
FIG. 2—is a view of a typical golf cart with this 2-sided enclosure on cart view FIG. 3—is a view of the 2-sided enclosure on the roof of the cart ready for the roll-on design Step 1

FIG. 2—is a drawing of a typical motorized golf cart with this invention, a 2-sided enclosure installed on the golf cart. The enclosure fits over the roof of the cart and the sides securely wrap around the side, front and rear of the cart. The enclosure is comprised of a top [3] and sides that are made of a water resistant, lightweight, durable cloth [1], [2] and clear vinyl [4], [5] that enables occupants to view out the side and rear of the cart. The 2-sided enclosure has a front right and left lower windpanel [8] and [9] that provides support for the installed enclosure and when connected blocks wind, rain and cold from entering under an already installed front windshield [98]. The front vinyl sides [16] and [17] wrap around the cart front roof support posts [93], [94] to block wind, rain and cold from entering around the windshield sides. The front vinyl sides [16] and [17] are held in place by a front right attachment strap/buckle [30] and front left attachment strap/buckle [31]. The enclosure sides are also securely held in place under the golf cart frame by bungee cords [18], [19]. A bungee pocket [34] is provided to keep bungee cords when the enclosure is rolled up for storage. A rear wind panel [6] blocks wind, rain and cold from the rear and provides stability from the rear.

FIGS. 3, 4, 5 and 6 demonstrate how the 2-sided design simplifies the installation process.

Figure 3:
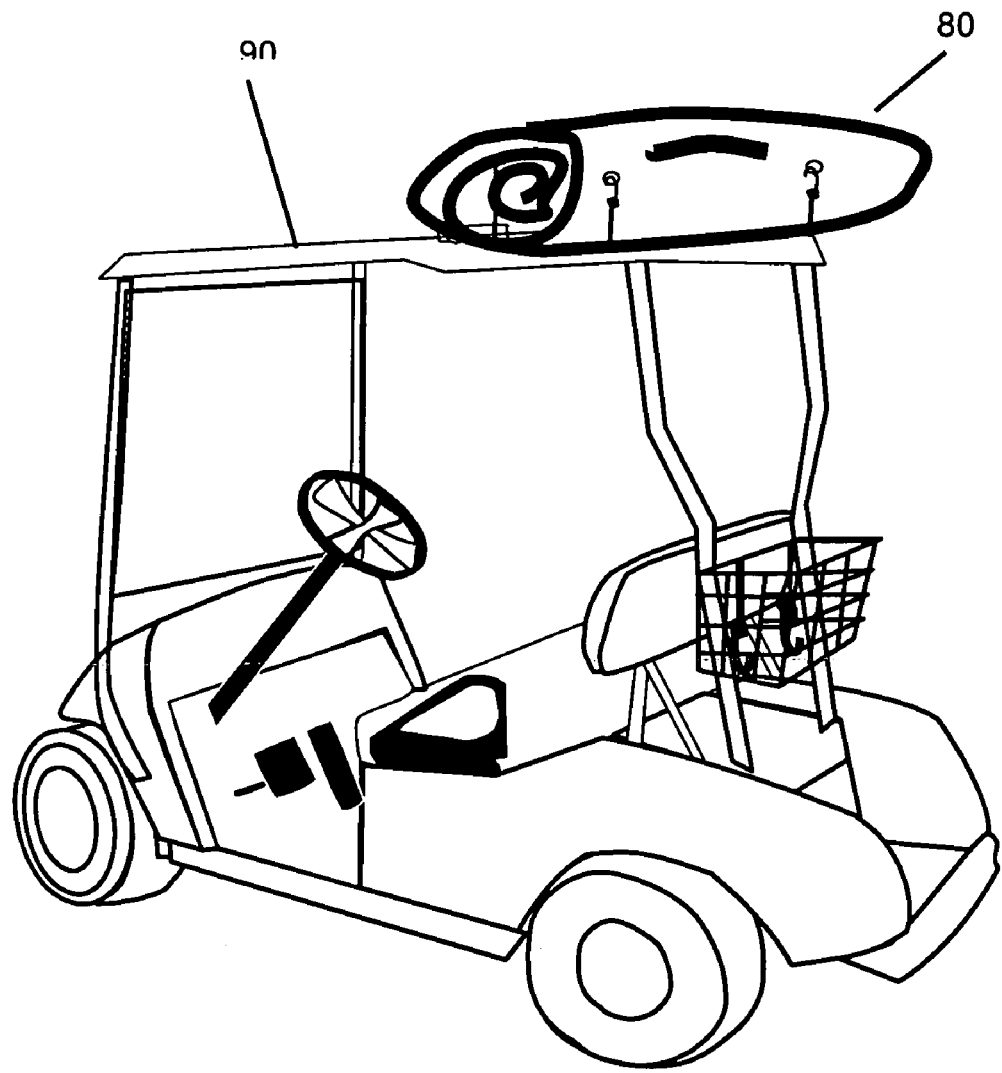

FIG. 3 shows the 2-sided enclosure rolled-up [80] placed on the roof of the golf cart [90] in preparation for the roll-on process.

Figure 4:
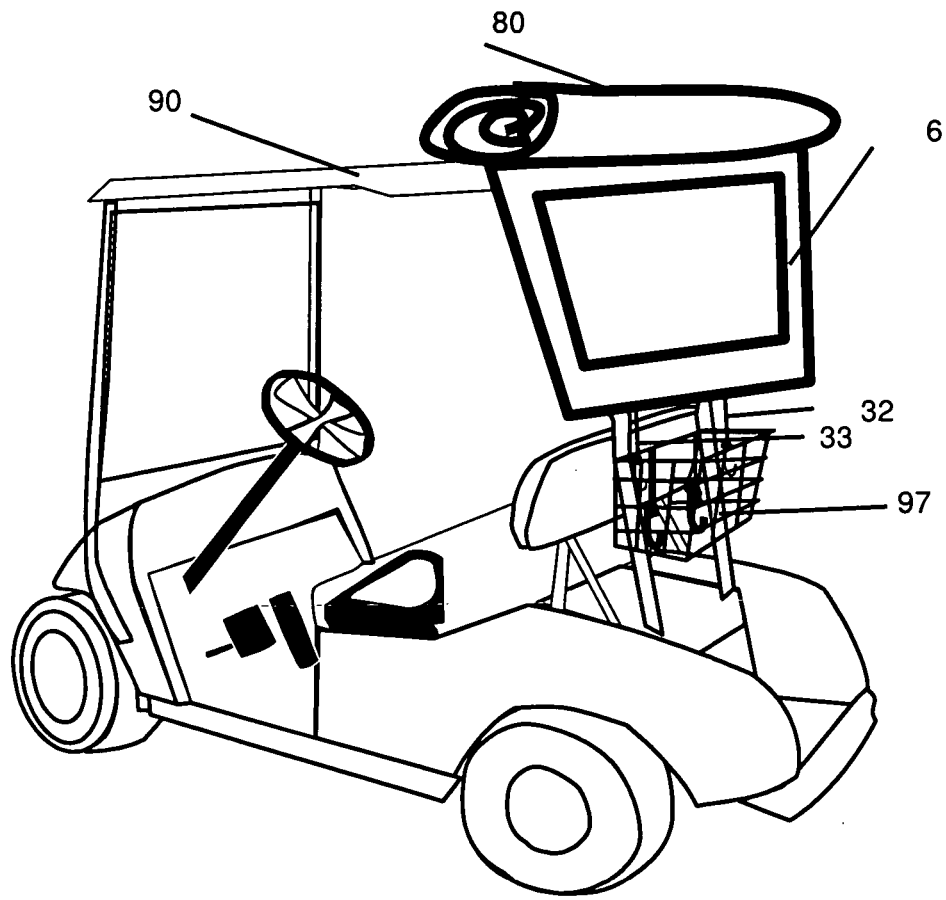
FIG. 4—is a view of the 2-sided enclosure roll-on design with rear windpanel attached Step 2

FIG. 4—shows the second step in the 2-sided enclosure roll-on process, which is to unroll the rear windpanel [6] and attach rear windpanel attachment straps [32], [33] to the rear basket [97] or other suitable place on the rear of the golf cart.

Figure 5:
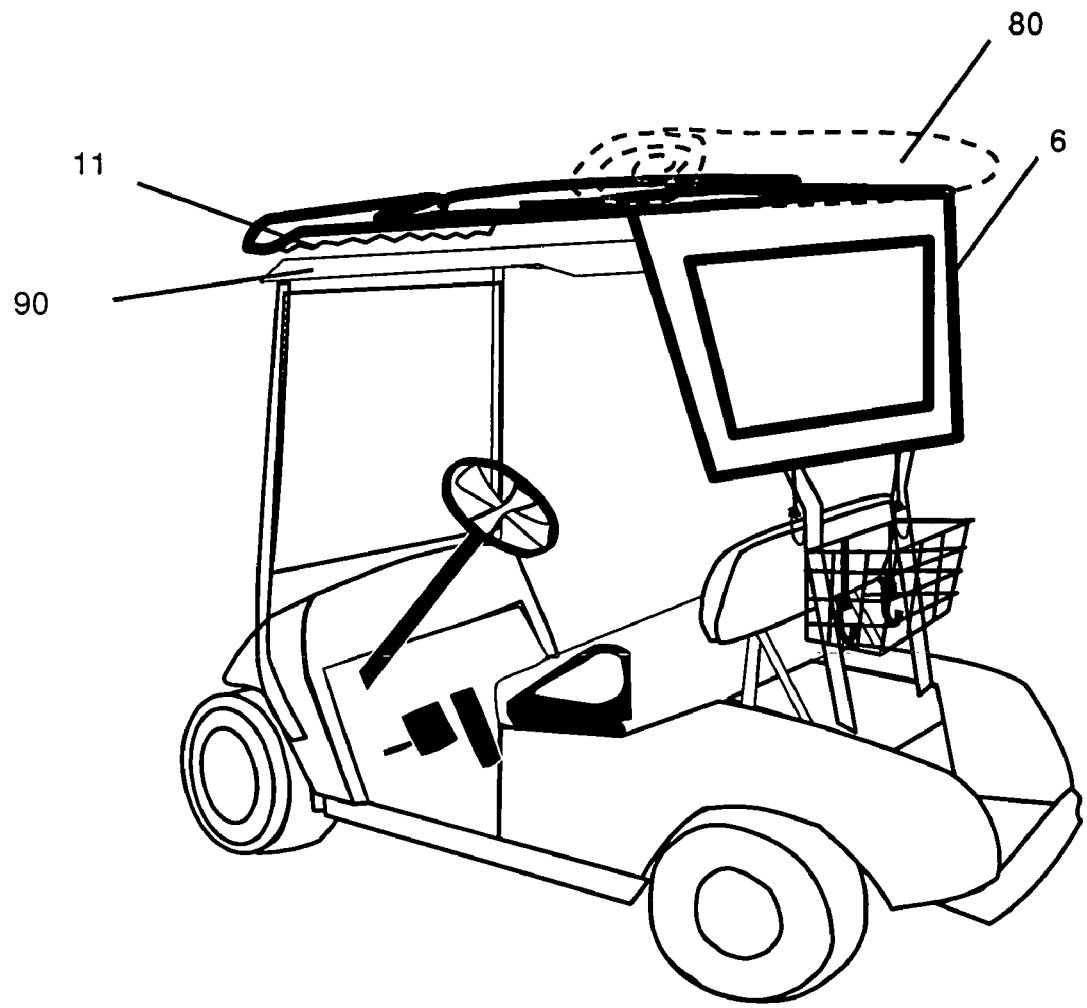
FIG. 5—is a view of the 2-sided enclosure roll-on design with front ready to be attached Step 3

FIG. 5—shows the third step in the roll-on process, which is to unroll the 2-sided enclosure [80] to expose the fitted front cover [11] and stretch said fitted front cover over the golf cart roof front. The fitted enclosure front may be elastic or other design to ensure a reliable fit over the cart roof front. After the Steps 2 and 3 are completed, the 2-sided enclosure will be securely attached to the golf cart rear and top.

Figure 6:
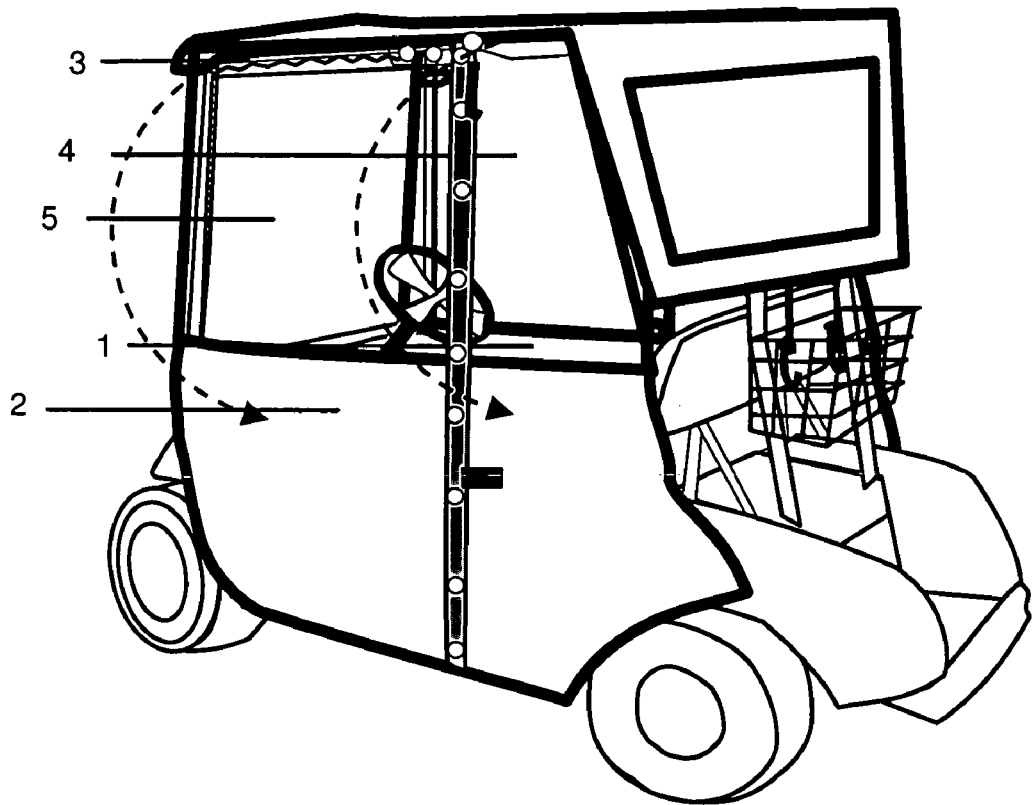
FIG. 6—is a view of the 2-sided enclosure roll-on design with sides down Step 4

FIG. 6—shows the next step is to release the 2-sided enclosure sides [2], [5] and [1], [4] from the cart roof [3]. When the 2-sided enclosure sides have been completely released, the wrap around features described in FIG. 7 can be connected to complete the wrap around weather seal.

Figure 7:
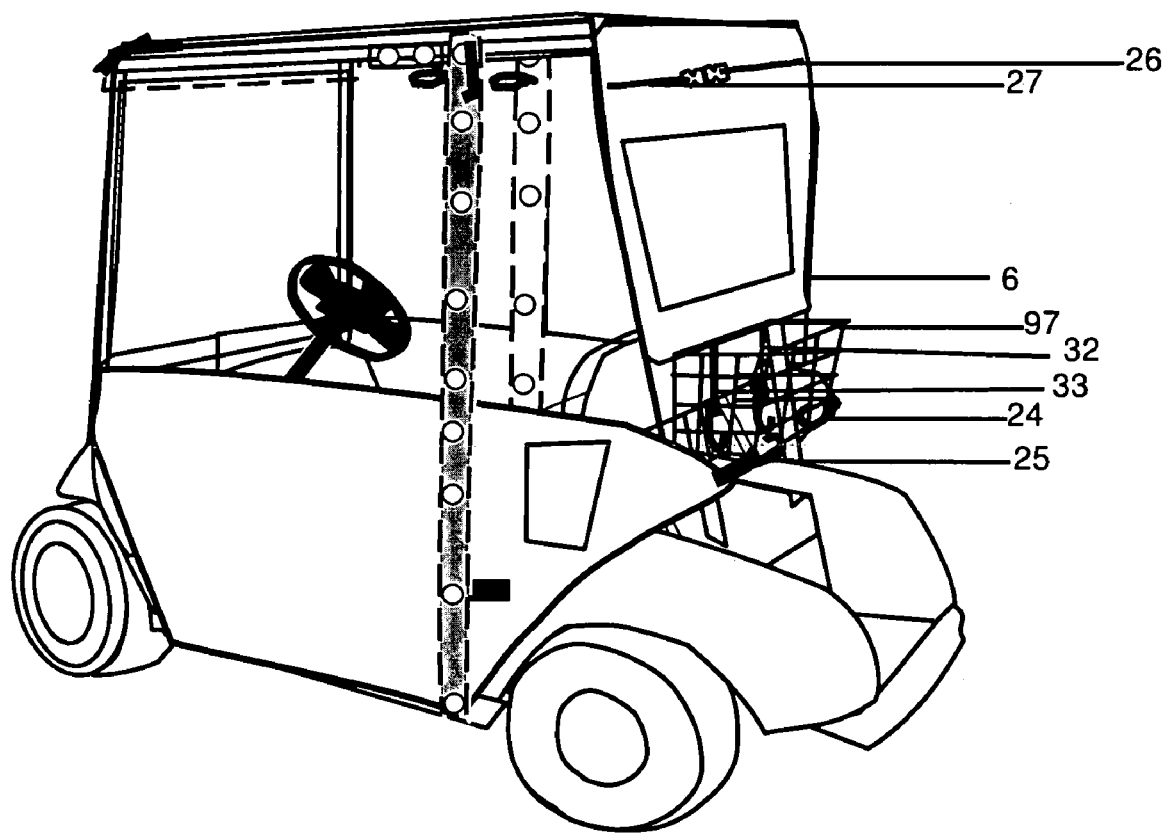
FIG. 7—is a perspective side/rear view of 2-sided enclosure on cart

FIG. 7—is a perspective drawing of a side/rear view of a 2-sided golf cart enclosure on a golf cart. This drawing shows the how the 2-sided golf cart enclosure wraps over and around the back of the golf cart. The rear wind panel [6] attaches to the golf cart basket [97] using left and right windpanel/attachment straps [32,33]. While most golf carts have a basket like device on the rear for storage, the attachment straps [32,33] may be alternately secured to other places on the rear of the golf cart, including golf bags when present. The left rear and right rear attachment straps/buckle [26] and [27] ensures the upper side panels' wrap-around is secure. The lower golf cart enclosure sides are secured to the basket [97] or alternately secured to other places on the rear of the golf cart, including golf bags when present by a left and right rear elastic attachment straps [24] and [25].

Figure 8:
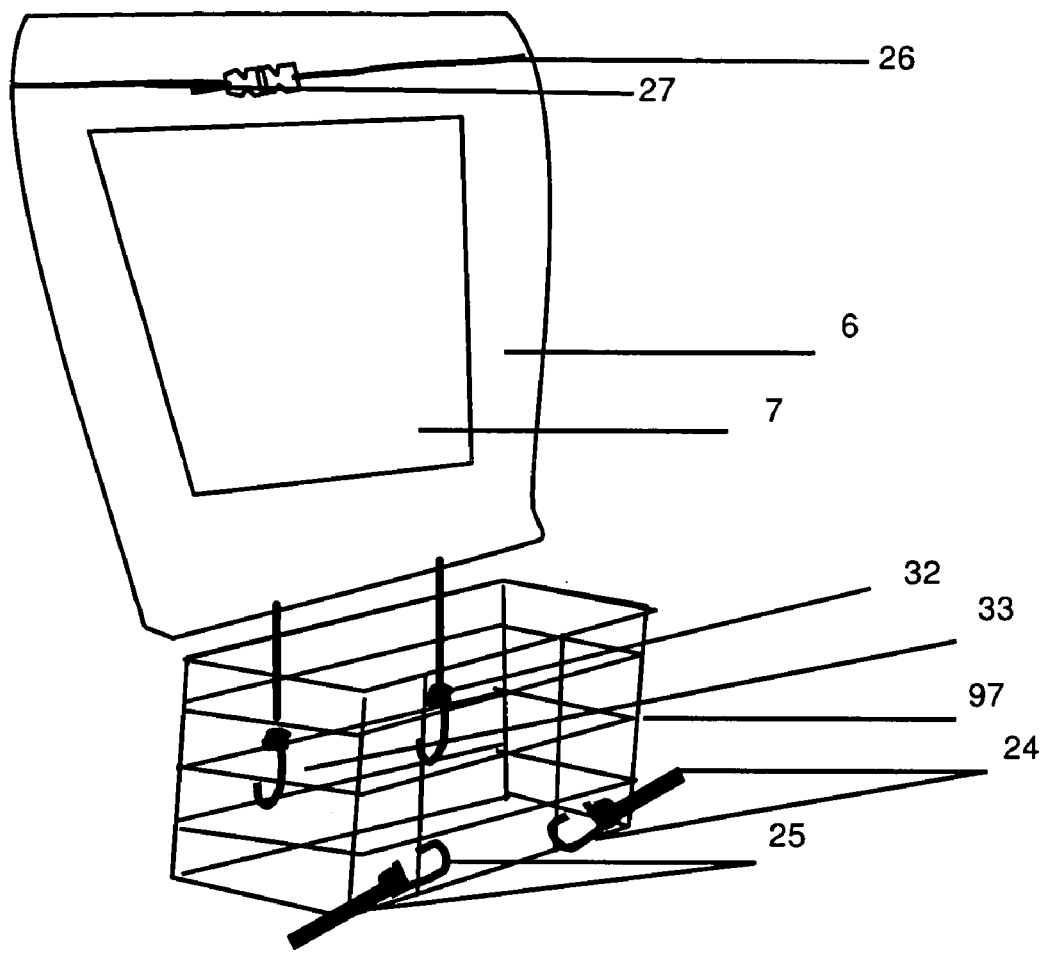
FIG. 8—is a close-up view of a 2-sided enclosure rear wind panel attached to golf cart FIG. 9—is rear perspective view of a 2-sided enclosure FIG. 10—is a front/side perspective view of a 2-sided enclosure with attachment features labeled FIG. 11—is layout view of a 2-sided enclosure FIG. 12—is a front/side perspective view of a 2-sided enclosure with magnetic door features labeled FIG. 13—is a cutaway outside view of a left side magnetic door partially open FIG. 14—is cutaway outside view of a left side magnetic door fully open FIG. 15—is a cutaway outside view of a left side magnetic door partially closed FIG. 16—is cutaway outside view of a closed left side magnetic door FIG. 17—is a front/side perspective view of a 2-sided enclosure on cart with left side magnetic door fully open FIG. 18—is a cutaway view of the 2-sided enclosure wrap-around seal features FIG. 19—is a cutaway view of front fitted 'bed sheet' like attachment FIG. 20—is a cutaway view of the 2-sided enclosure front upper windpanel features on a cart FIG. 21—is an cutaway view of the 2-sided enclosure with front upper windpanel sealed on golf cart FIG. 22—is a cutaway view of the 2-sided enclosure with door fully open and attached to sealed upper windpanel FIG. 23—is a layout view of the 2-sided enclosure prior to beginning the rollup process. A feature of the 2-sided enclosure design is easy roll-up for storage. Since the 2-sided enclosure will lie on to a flat surface, it can be rolled up like a sleeping bag.

FIG. 8—is a close-up cutaway view of the rear of the golf cart enclosure and the golf cart basket [97]. The rear windpanel [6] provides protection from wind, rain and cold from the rear. The rear windpanel [6] has a window [7] that provides for rear visibility for the occupants. The rear windpanel attaches to the rear basket [97] or alternately other places on the rear of the golf cart, including golf bags when present by elastic rear attachment/storage straps [32] and [33]. The rear attachment/storage straps [32] and [33] are stretched to accommodate different golf cart manufacturer models and attachment points. The rear left and right attachment straps/buckle [26] and [27] ensures the upper side panels' wrap-around is secure. The rear attachments straps [24] and [25] pull the lower enclosure sides and front towards the rear, which stabilizes the enclosure on the cart.

Figure 9:
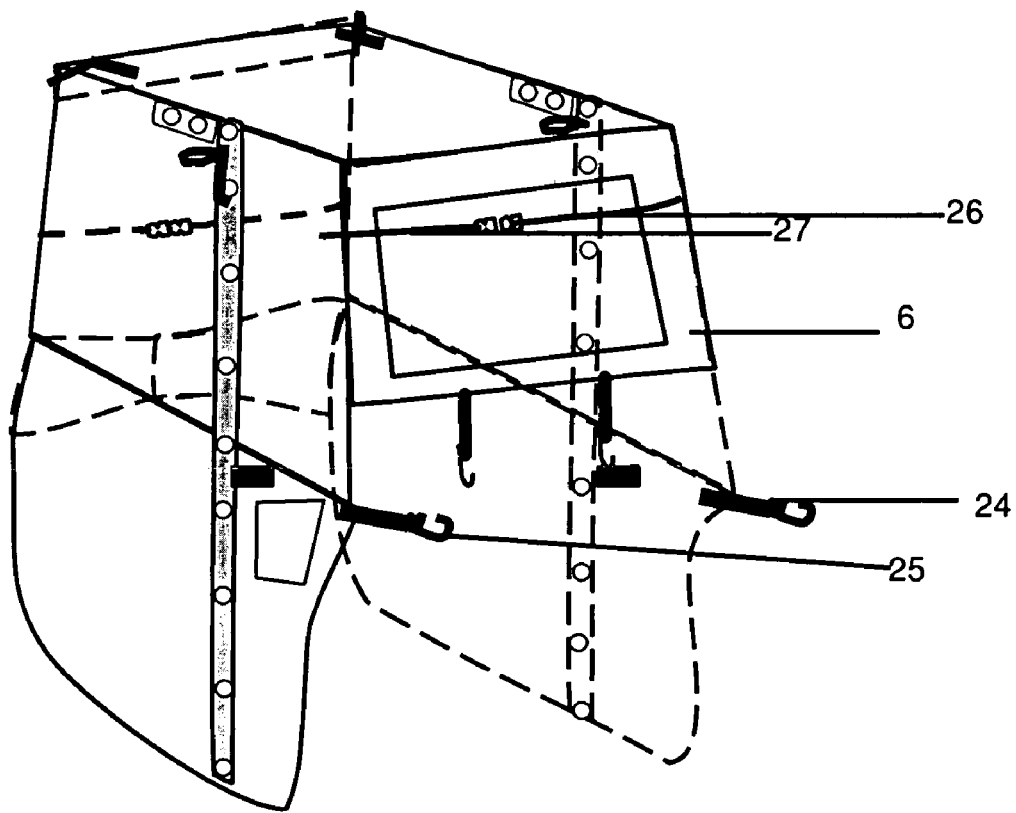

FIG. 9—is a rear perspective view of the 2-sided enclosure removed from golf cart. This view shows rear attachments including rear attachment strap/buckle [26, 27], rear wind panel [6], and rear side elastic attachment straps [24, 25].

Figure 10:
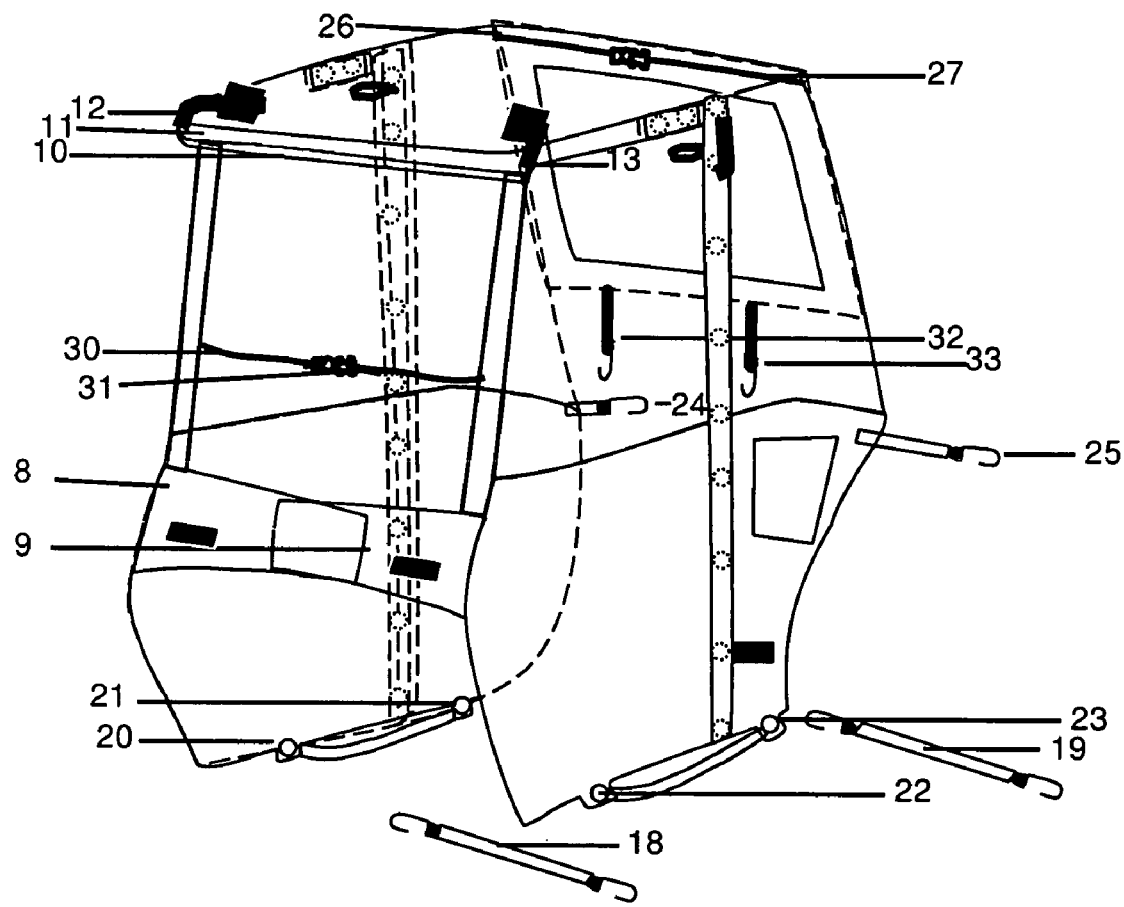

FIG. 10—is a front/side perspective view of a 2-sided enclosure removed from cart with attachment features labeled. Two bungee cords [18,19] stretch between grommet holes [20,21,22,23] under the golf cart to hold the enclosure sides securely in place. The front wrap around seal is secured using the lower wind panel [8,9], upper windpanel fitted cover [11], upper windpanel [10] upper windpanel attachment straps [12,13] and front attachment strap/buckle [30, 31]. The rear wrap around seal is secured using the windpanel/attachment straps [32,33], side rear elastic attachment strap/buckle [24,25] and rear attachment straps/buckle [26, 27]].

Figure 11:
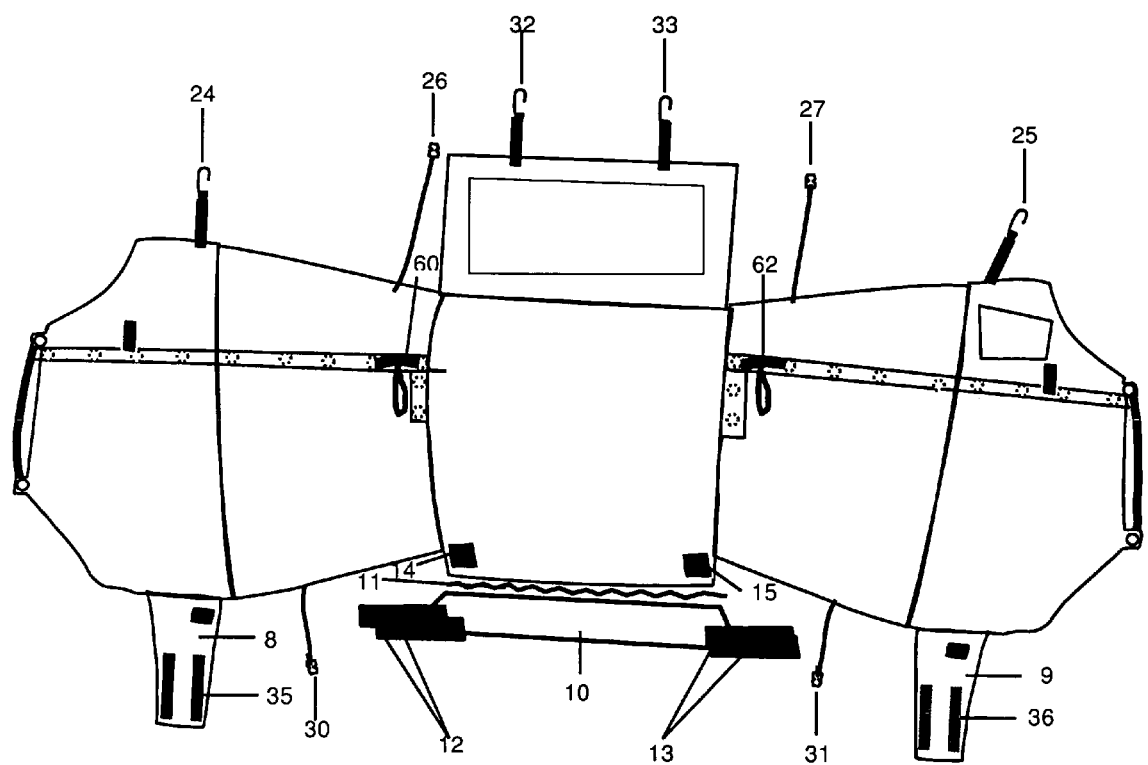

FIG. 11—is a layout view of the 2-sided golf cart enclosure with key wrap-around features highlighted. Hook straps [36] located under the left lower windpanel [9] and loop straps [35] located on the outside of the right lower windpanel [8] connect to secure the lower windpanel below the cart windshield. Double hook straps [12,13] connect to the front roof windpanel/door open attachment loop strips [14,15]. The double hook straps also serve as a home for the door handle loop [60,62] to connect and remain in the open position. The lower windpanel is comprised of two pieces left [9] and right [8]. Front and rear connector straps/buckles [30,31] and [26, 27] are also shown. Rear wind panel attachment straps [32] and [33] connect to the rear basket along with the rear side attachment straps [24] and [25]. The front fitted 'bed sheet' corner [11] and front top windpanel [10] are shown on this view.

Figure 12:
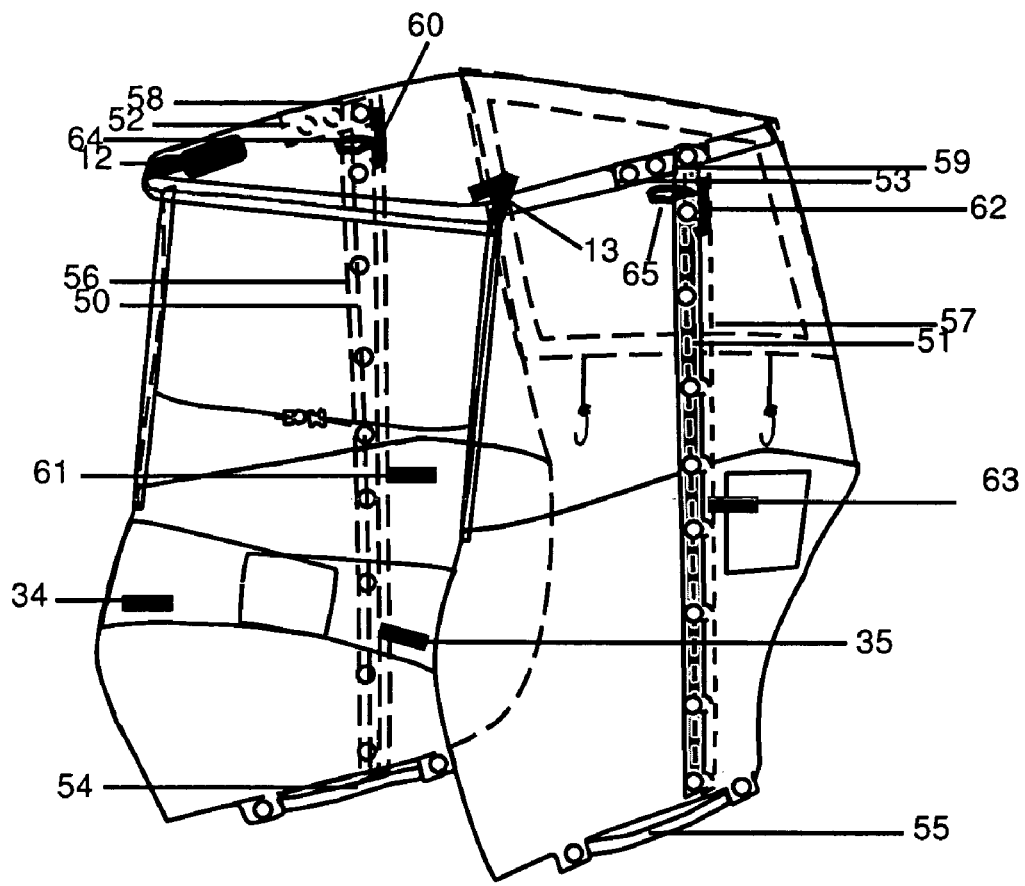

FIG. 12—shows a detailed magnetic door feature listing. Both doors have vertical magnet strips [50, 51] that connect to vertical side magnetic strips [56, 57]. Each door has a horizontal top magnetic strip [52, 53] that attaches to the left and right side panel magnetic strip [58, 59]. Each door has an outside loop strap pull handle [60, 62] used to pull the door open and connect to the front top windpanel attachment hook strap [12,13]. Both doors have an inside upper door close loop [64, 65] used by occupants to pull the door closed. The lower magnetic door open loop straps [61, 63] attach to the front windpanel door open hook strips [34, 35]. There are door support straps [54, 55] at the bottom of each door to maintain the proper door opening size.

Figure 13:
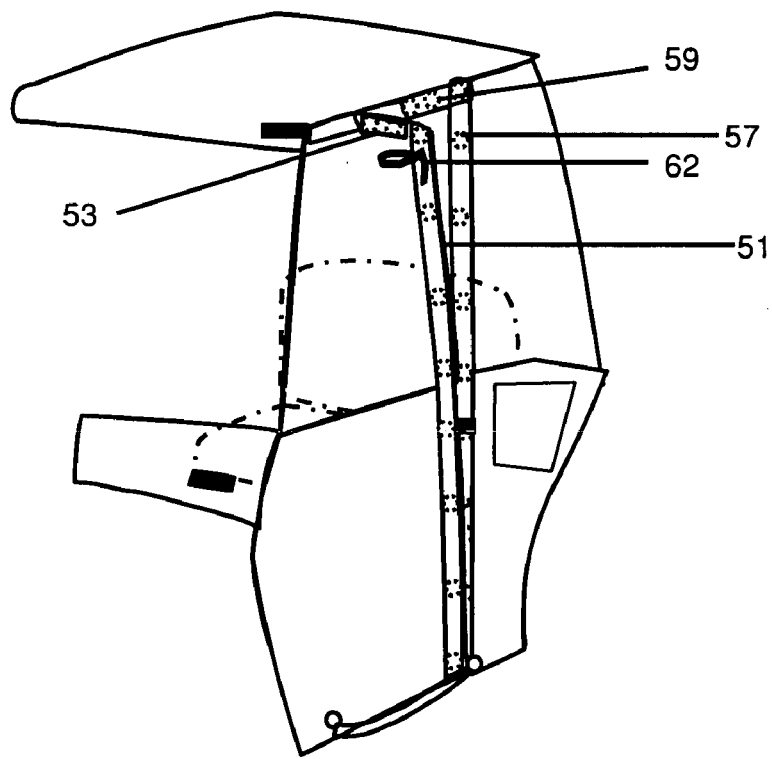

FIG. 13—shows a partially opened left magnetic door. The occupant simply pulls on the left upper magnetic door open/close handle [62] causing the left door magnetic strip [51] and the left door top magnet strip [53] release from the side and top magnetic close strips [59] and [57] and begins to open.

Figure 14:
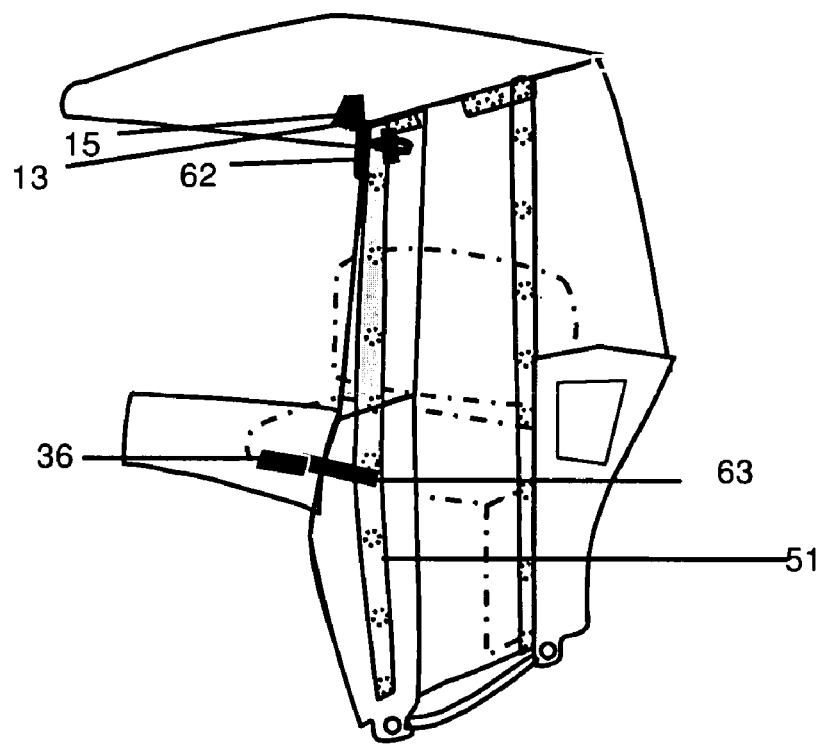

FIG. 14—the door opening is completed by pulling the door towards the cart front and the upper door open/close handle [62] made of loop material is attached to the front top windpanel attachment hook strap [13] attached to the front roof windpanel/door open attachment loop cloth [15]. The lower door is secured to the front left lower windpanel open loop strip [36] using the left lower magnetic door open hook strap [63]. When completely opened, a generous opening is created.

Figure 15:
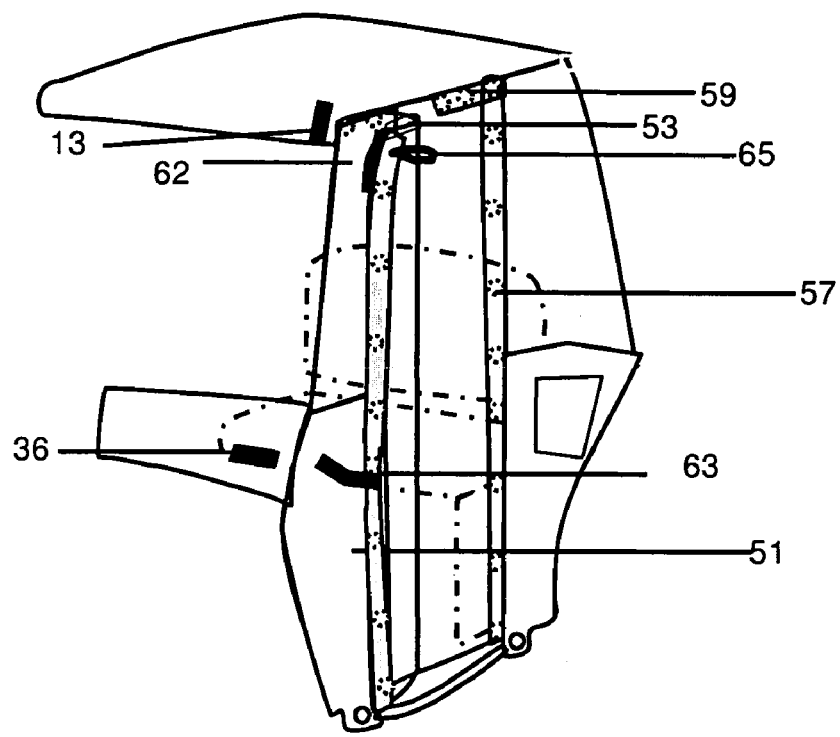

FIG. 15—is an outside view of a partially closed magnetic door. The door is closed by disengaging the two open door hook and loop connections, the door handle [62] and the front left top windpanel hook strap [13] and the door left lower magnetic door open hook strap [63] and the front left lower windpanel open loop strip [36]. Once the hook and loop connections are disengaged, the occupant simply grasps the door inside close loop [65] and pulls the door closed until door side magnet strip [51] and door top magnet strip [53] seeks and finds the enclosure side magnet strip [57] and enclosure top magnet strip [59].

Figure 16:
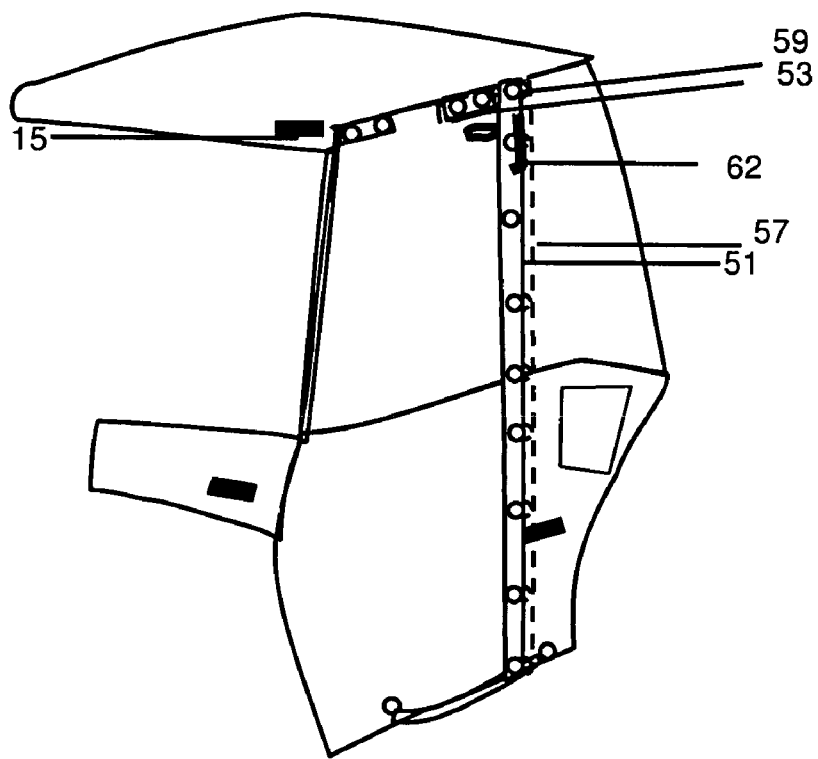

FIG. 16—is a view of the closed left side magnetic door. The left door has a vertical door magnetic strip [51] that connects to the left side vertical magnetic close strips [57] to keep the door closed. There is also a left side door top magnetic door strip [53] and top close strips [59] that keep the door top sealed during rainy, cold and windy conditions. When closed, the top panel magnetic close strip [59] may be folded over topside of cart door to seal door top from heavy rain.

Figure 17:
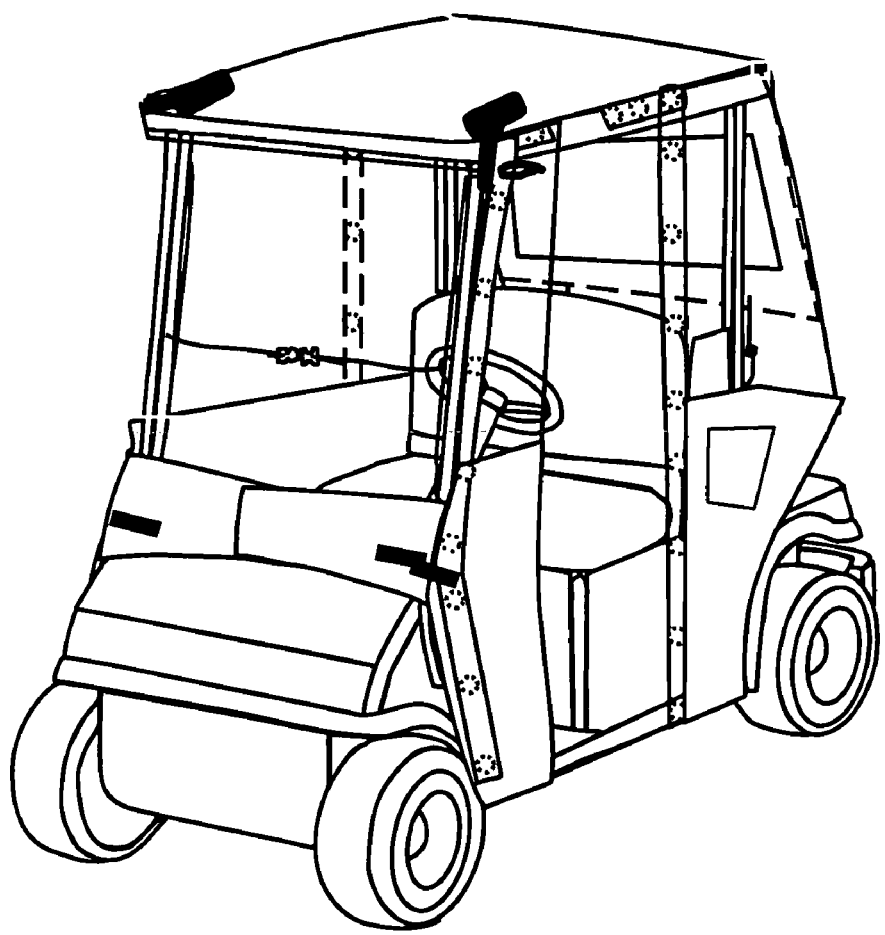

FIG. 17—is a perspective view of an open left side door on a golf cart that shows the spacious opening created by the horizontal swing away door, which improves occupant ingress and egress.

Figure 18:
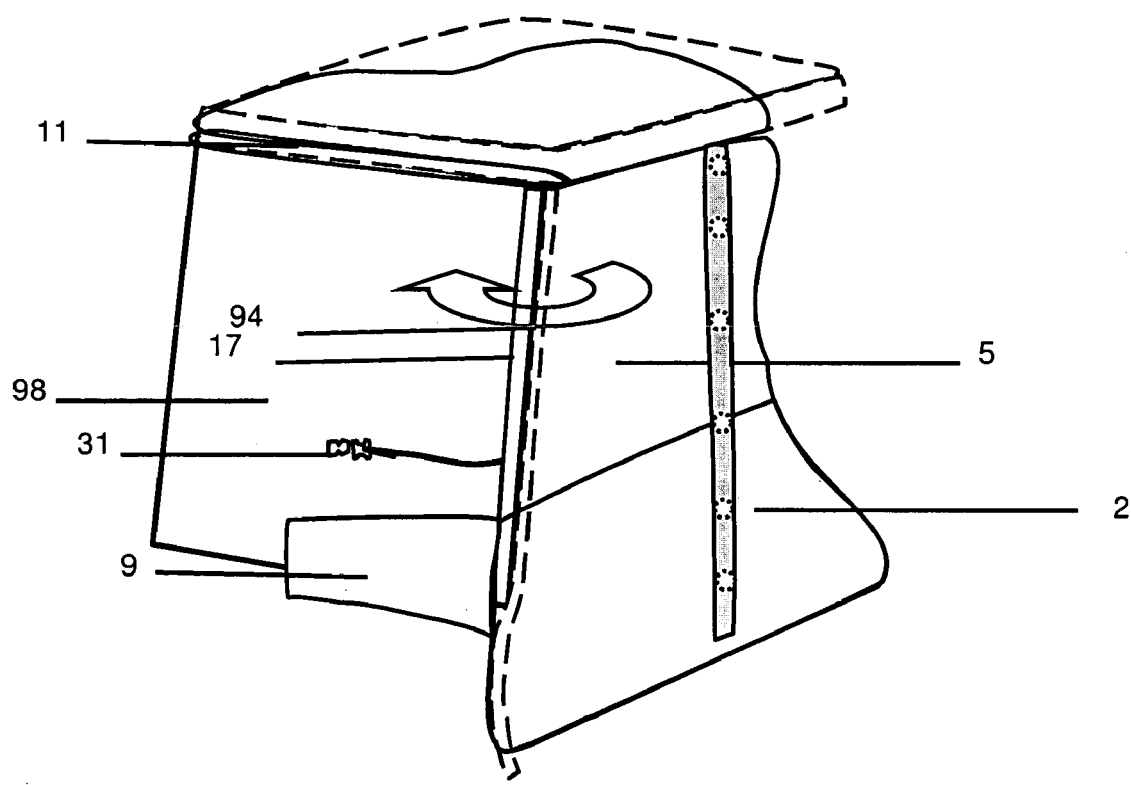

FIG. 18—is a cutaway view of the 2-sided enclosure side wraparound features. Each side of the enclosure [2] and [5] is pulled around the left cart top support post [94] by the left front lower windpanel [9] and the mid front left attachment strap [31]. The wrap around seal [17] keeps wind, rain and cold from entering the enclosure around the front cart windshield [98].

Figure 19:
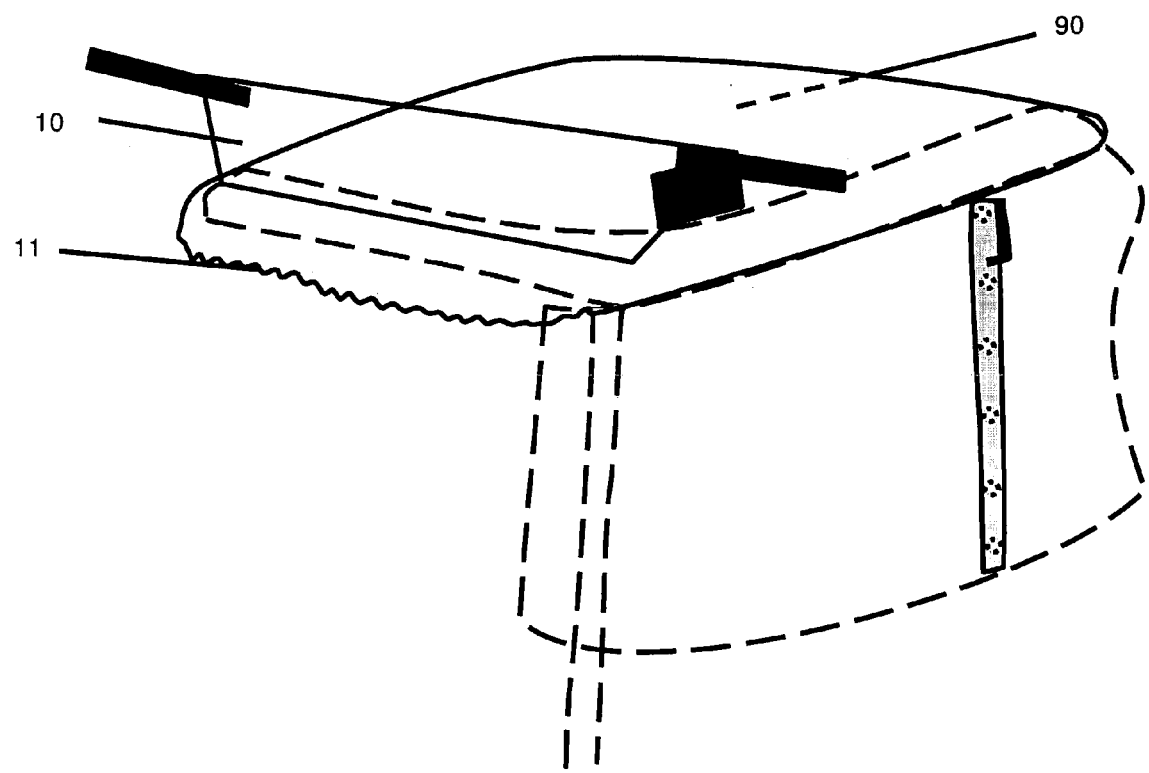

FIG. 19—is a cutaway view of front top fitted cover. The front top fitted cover [11] stretches over the golf cart roof [90] front to securely hold the 2-sided enclosure on the golf cart roof. The fitted enclosure front may be elastic or other design to ensure a reliable fit over the cart roof front. This figure shows the front windpanel [10] folded up and away to expose the front top fitted cover [11].

Figure 20:
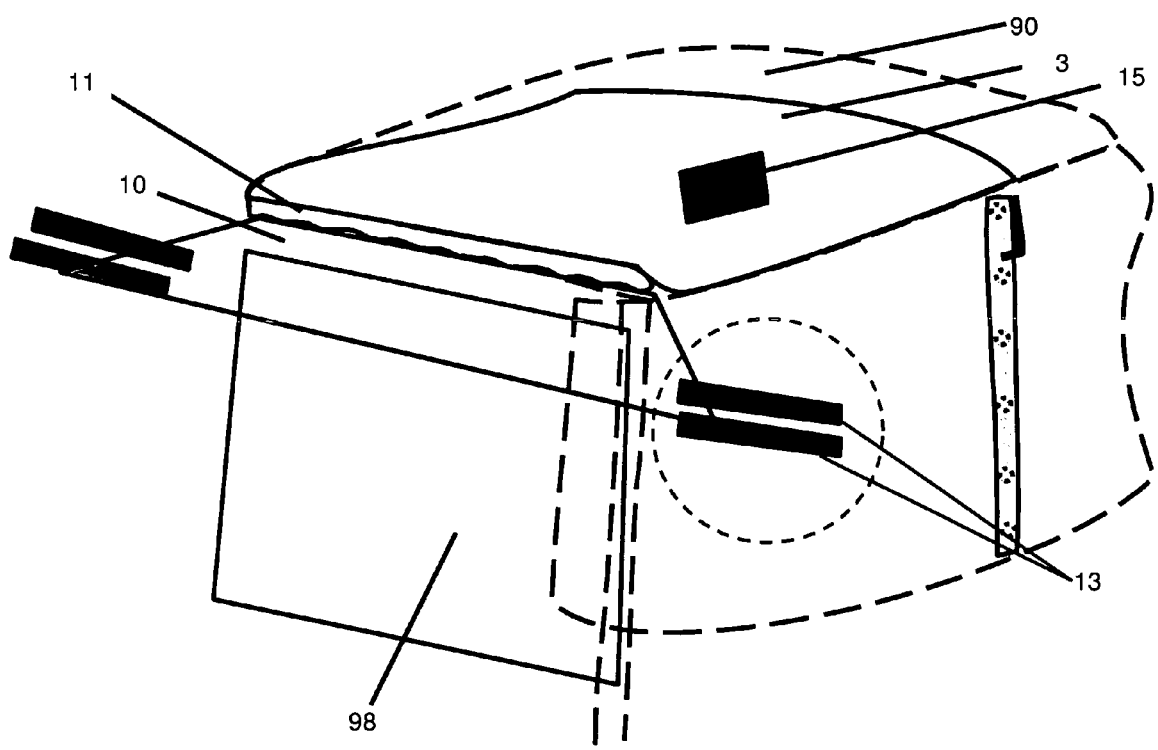

FIG. 20—is a cutaway view of the 2-sided enclosure front upper wind panel features on a cart. The cart enclosure top [3] is stretched over the cart roof [90] using the fitted cover [11]. The front upper windpanel [10] is wrapped over the opening between the top of the front windshield [98] and the cart roof [90]. The front upper windpanel attachment strap [13] is made of two strips of hook material sewn back to back. The front upper windpanel attachment strap [13] pulls the front upper windpanel into place and attaches to front left windpanel loop attachment loop cloth [15].

Figure 21:
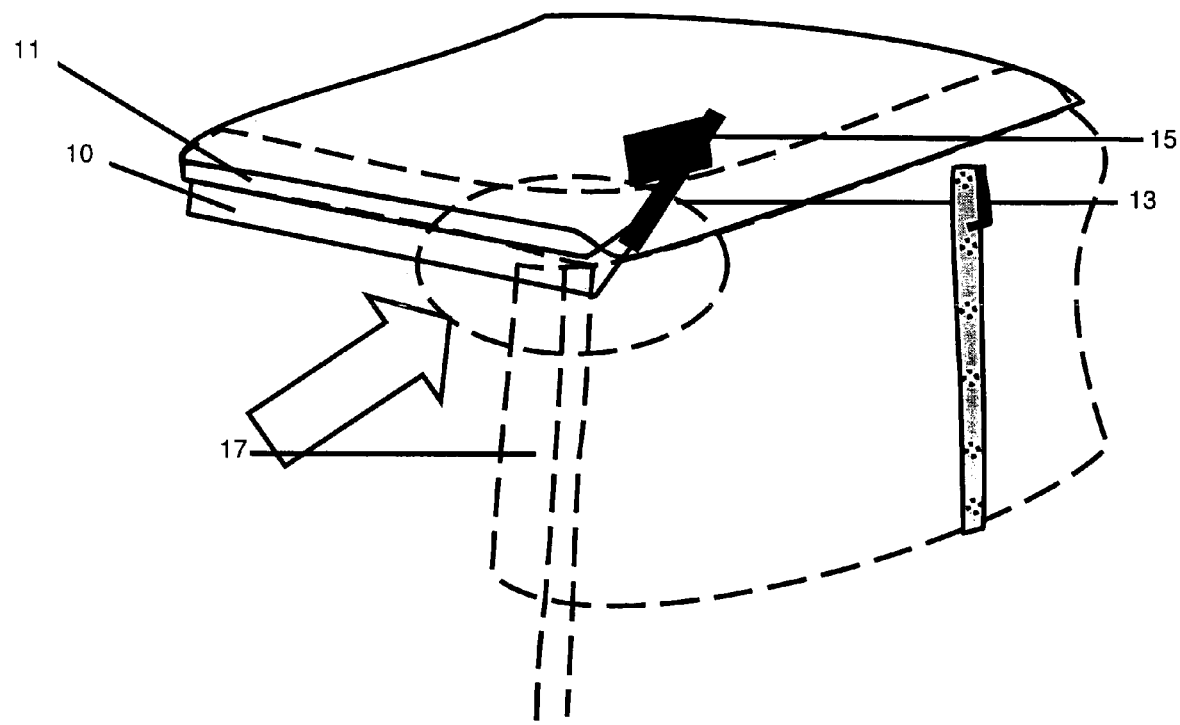

FIG. 21—shows the front upper windpanel [10] being pulled into place by pulling the left windpanel attachment strap [13] and connecting the bottom hook material to the front left roof attachment loop cloth [15].

Figure 22:
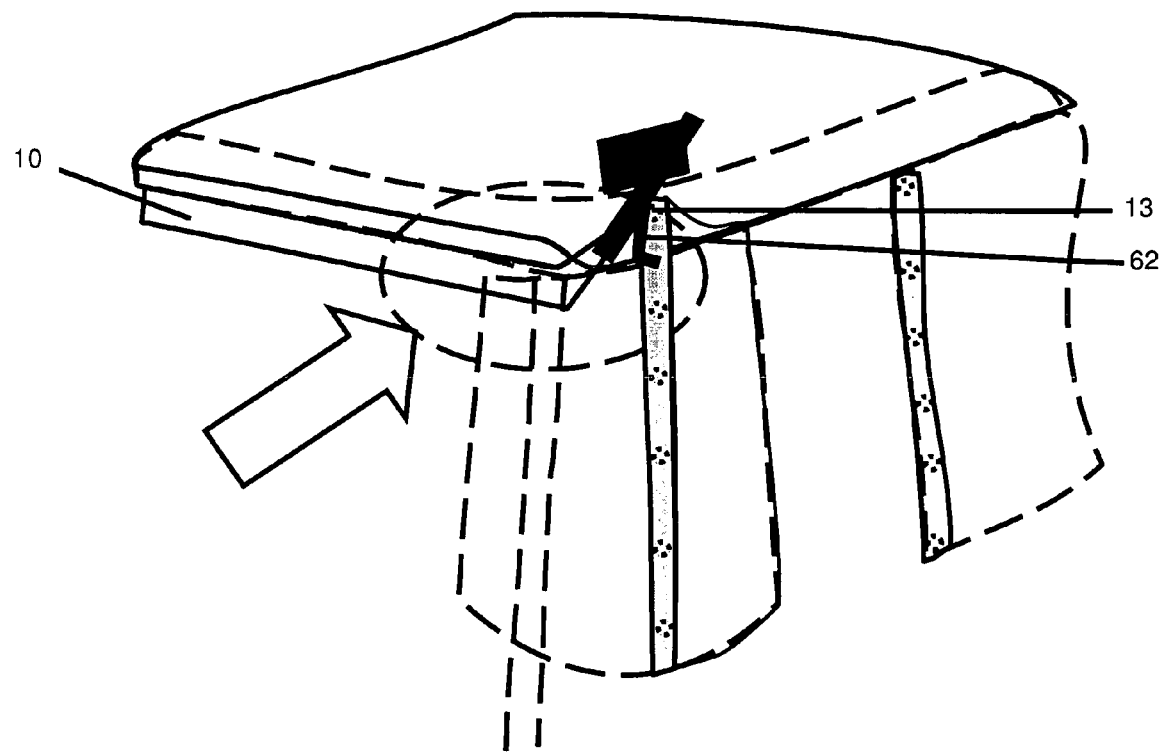

FIG. 22—is a cutaway view of an open door attached to the sealed upper windpanel [10]. The double hook upper windpanel attachment strap [13] provides an attachment home for the door handle loop material [62] to keep the upper door corner in the open position as desired.

Figure 23:
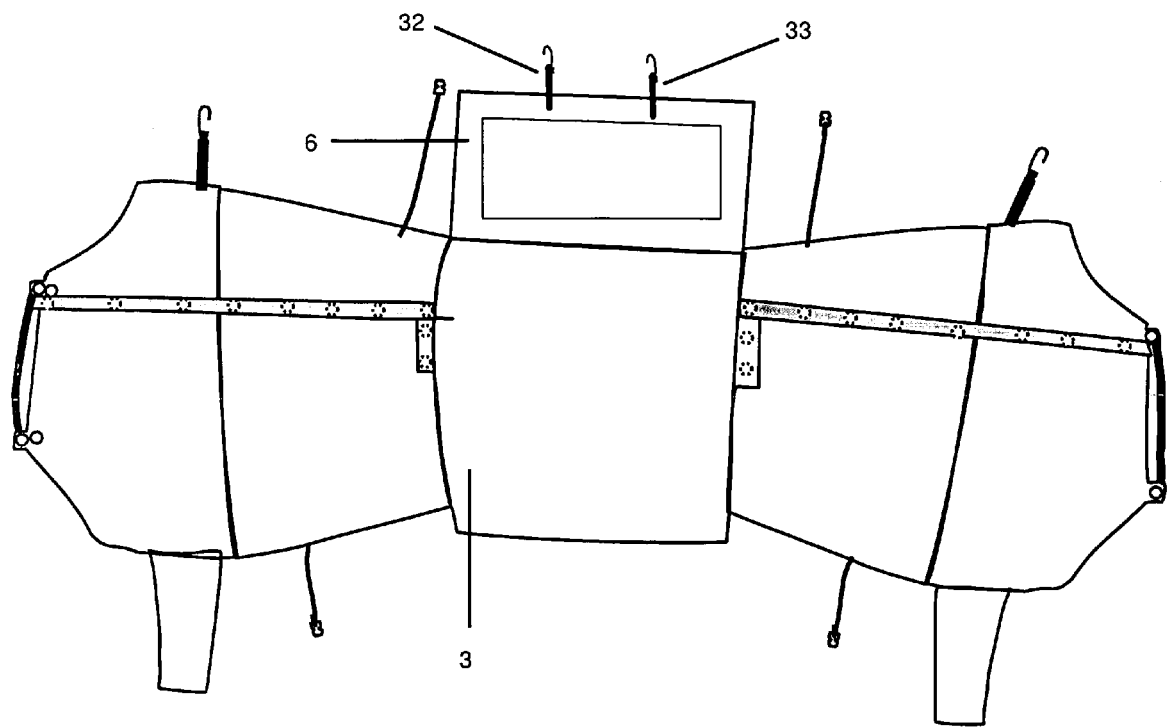

FIG. 23—is a layout view of the 2-sided enclosure prior to beginning the rollup process. A design feature of this enclosure is that can be easily rolled for storage. Since the 2-sided enclosure will lie on to a flat surface, it can be rolled up similar to a sleeping bag. The sides are folded onto the enclosure roof [3] and then rolled toward the rear windpanel [6] and secured using the rear windpanel attachment straps [32] and [33].

Figure 24:
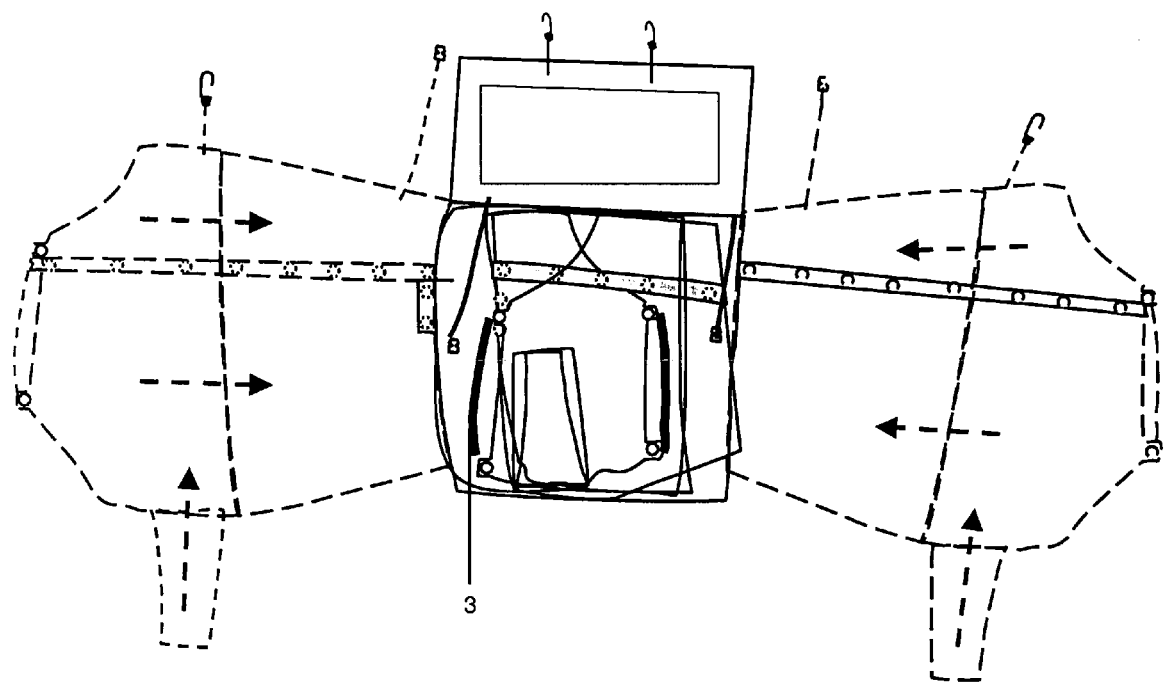
FIG. 24—is step 1 of the 2-sided enclosure rollup process. The first step of the rollup process is to fold both sides onto the top cloth [3].

FIG. 24—shows the first step of the 2-sided enclosure rollup process. The first step of the rollup process is to fold the sides onto the top cloth [3].

Figure 25:
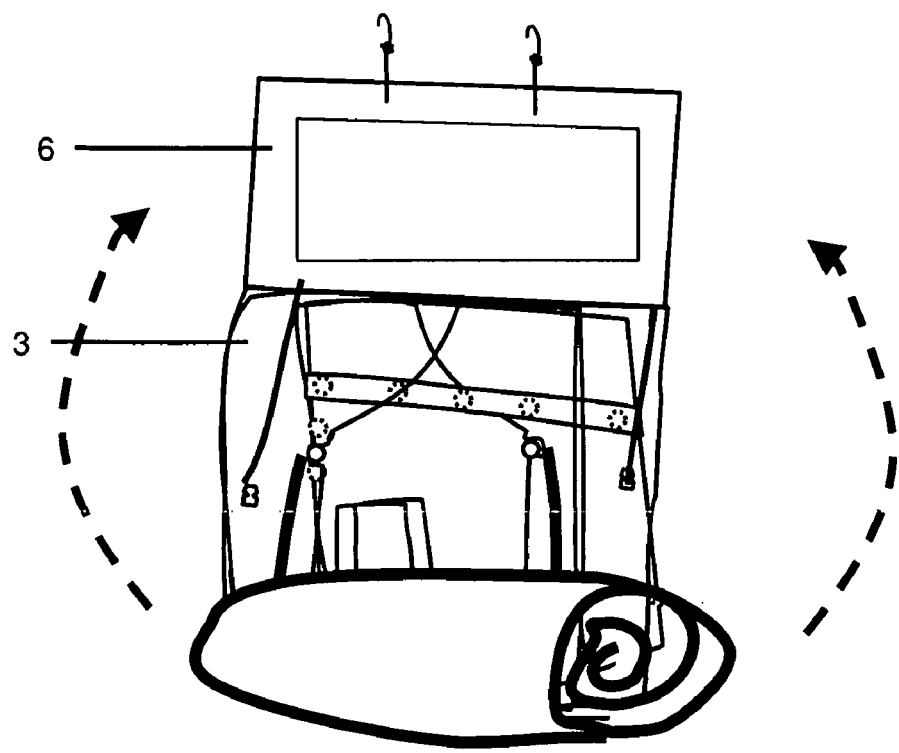
FIG. 25—is step 2 of the 2-sided enclosure rollup process. The second step of the rollup process is to rollup folded enclosure.

FIG. 25—is step 2 of the 2-sided enclosure rollup process. The second step of the rollup process is to roll the folded sides and top [3] towards the rear windpanel [6].

Figure 26:
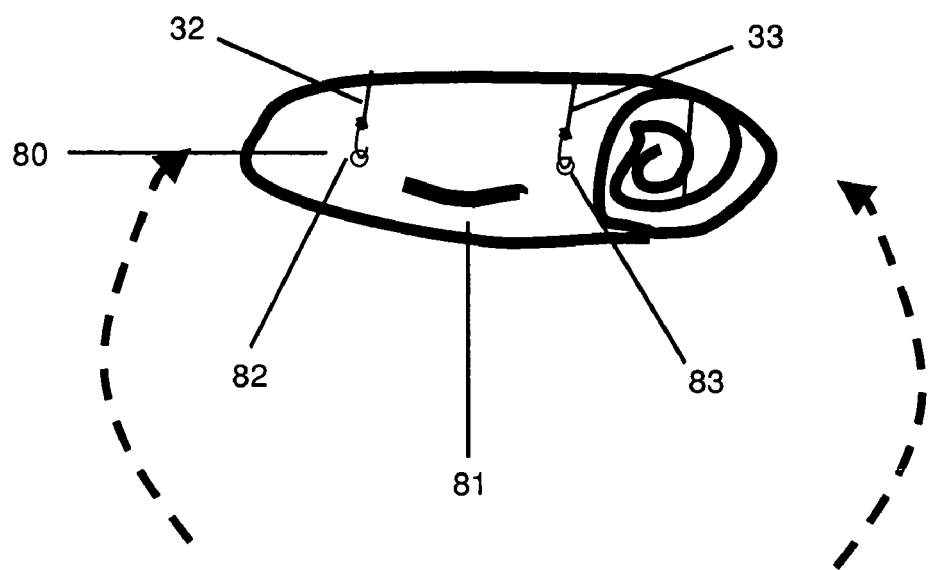
FIG. 26—is step 3 of the 2-sided enclosure rollup process. The third step of the rollup process is to complete the rollup and secure closed.

FIG. 26—is the view of the 2-sided enclosure rolled-up [80]. The final step is to connect the rear windpanel attachment straps [32] and [33] to the rollup rings [82] and [83]. The carry handle [81] is visible and the rolled up enclosure [80] is ready for transport or storage as desired.

DRAWINGS

Main Enclosure Features
1 Right side cloth
2 Left side cloth
3 Top cloth
4 Right side clear vinyl
5 Left side clear vinyl Wind Panels
6 Rear windpanel/golf bag rain cover
7 Rear windpanel clear vinyl window
8 Front lower right cloth wind panel
9 Front lower left cloth wind panel
10 Front top vinyl wind panel
11 Front top windpanel fitted corner
12 Front top right windpanel attachment hook strap
13 Front top left windpanel attachment hook strap
14 Front right roof windpanel/door open attachment loop cloth
15 Front left roof windpanel/door open attachment loop cloth
16 Right side wrap around windpanel
17 Left side wrap around windpanel Main Attachments
18 Front under cart bungee attachment strap
19 Rear under cart bungee attachment strap
20 Right front bungee attachment grommet holes
21 Right rear bungee attachment grommet holes
22 Left front bungee attachment grommet holes
23 Left rear bungee attachment grommet holes
24 Right side rear elastic attachment strap/buckle
25 Left side rear elastic attachment strap/buckle
26 Right rear attachment strap
27 Left rear attachment strap
30 Front right attachment strap/buckle
31 Front left attachment strap/buckle
32 Rear right windpanel attachment strap/storage strap/buckle
33 Rear left windpanel attachment strap/storage strap/buckle
34 Driver door bungee storage pocket
35 Front right lower windpanel door open loop cloth
36 Front left lower windpanel door open hook cloth Magnetic Door Features
50 Right door vertical magnet strip
51 Left door vertical magnet strip
52 Right door top magnet strip
53 Left door top magnet strip
54 Right door support strap
55 Left door support strap
56 Right side panel magnet close strip
57 Left side panel magnet close strip
58 Right top panel magnet close strip
59 Left top panel magnet close strip
60 Right upper magnetic door open hook handle
61 Right lower magnetic door open hook strap
62 Left upper magnetic door open hook handle
63 Left lower magnetic door open hook strap
64 Right side upper inside door close loop
65 Left side upper inside door close loop Roll-up features
80 2-Sider rolled-up
81 Carry handle
82 Storage strap right hook
83 Storage strap left hook Golf Cart Overview
90 Roof
91 Occupant interior
92 Cart Body
93 Front right roof support post
94 Front left roof support post
95 Rear right roof support post
96 Rear left roof support post
97 Rear cart basket
98 Cart windshield

What is claimed:

1. A portable enclosure, for a golf cart having a roof and front windshield supported by front golf cart vertical windshield support struts, the portable enclosure comprising:
a roof panel that has a front, a rear, a right side, and a left side;
a left side panel that has a top portion that is attached to the left side of the roof panel;
a right side panel that has a top portion that is attached to the right side of the roof panel;
a rear windpanel that has a top portion that is attached to the rear of the roof panel;
an upper windshield panel is attached to the roof front;
a left front windshield panel is attached to a front edge of the left side panel, the left front windshield panel has a top and a bottom, the top of the left front windshield panel is located below a vertical midpoint of the left panel,
a right front windshield panel is attached to a front edge of the right side panel, the right front windshield panel has a top and a bottom, the top of the right front windshield panel is located below a vertical midpoint of the right panel,
wherein, when the portable enclosure is attached to the golf cart, the right and left front windshield panels may be fastened together;
wherein, when the portable enclosure is attached to the golf cart, the upper windpanel may be fastened to the roof sides.

2. The portable enclosure of claim 1, wherein the windshield forms a lower gap between the windshield bottom and the golf cart, the right front windshield panel and left front windshield panel cover the gap when fastened together.

3. The enclosure set forth in claim 1, wherein sides are pulled together around the front golf cart windshield by an adjustable support strap that enables said enclosure to fit a plurality of golf cart designs to block wind, rain and cold from the occupants and to provide stability for the enclosure.

4. The enclosure set forth in claim 1, wherein said enclosure upper front windshield panel is adjustable to enable said enclosure to fit a plurality of golf cart designs, and cover the opening above the already installed windshield to block wind, rain and cold from occupants and to provide stability for the cover.

5. The portable enclosure of claim 1, where in the rear windpanel is adjustable, the adjustable rear windpanel enables the enclosure to fit a plurality of golf cart designs, to cover the open space behind golf cart occupants and above the golf cart basket to block wind, rain and cold from the occupants and to provide stability for the enclosure.

6. The portable enclosure set forth in claim 1, wherein an adjustable rear support strap pulls the upper rear portions of each side panel together to enable the enclosure to fit a plurality of golf cart designs and to provide stability for the enclosure.

7. The enclosure set forth in claim 1, wherein connectors can be disconnected and reconnected to enable said rear windpanel to be folded away to accommodate an already provided golf club cover canopy, or stretched over the golf clubs to shield clubs from rain if a canopy is not present.

8. The portable enclosure of claim 1, where in the golf cart has a windshield that forms an upper gap between the windshield top and the golf cart roof, the upper windshield panel attached to the roof front covers the gap when secured over the top of the windshield.

9. The portable enclosure of claim 1, where in the enclosure has a front windshield adjustable support strap that pulls the enclosure sides around the front golf cart vertical windshield support struts and an upper windshield panel that secures the enclosure around the golf cart front and upper windshield, alternatively may be disconnected and re-connected to allow the golf cart windshield to be opened to enable warm weather ventilation.

10. A portable enclosure for a golf cart having a roof and a front windshield, the portable enclosure comprising:

a roof panel that has a rear, a right side, and a left side;
a left side panel that has a top portion that is attached to the left side of the roof panel;
a right side panel that has a top portion that is attached to the right side of the roof panel;
a rear windpanel that has a top portion that is attached to the rear of the roof panel;
an upper windshield panel is attached to the roof front;
a left front windshield panel is attached to a front edge of the left side panel, the left front windshield panel has a top and a bottom, the top of the left front windshield panel is located below a vertical midpoint of the left side panel;
a right front windshield panel is attached to a front edge of the right side panel, the right front windshield panel has a top and a bottom, the top of the right front windshield panel is located below a vertical midpoint of the right side panel;
wherein, when the portable enclosure is attached to the golf cart, the right and left front windshield panels may be fastened together and, wherein, the panels can be rolled onto the golf cart roof;
wherein, when the portable enclosure is attached to the golf cart, the upper windpanel may be fastened to the roof sides and, wherein, the upper windpanel can be rolled onto the golf cart roof.

11. The enclosure set forth in claim 10, wherein said enclosure rear windpanel is connected to a secure location on the rear of the golf cart to provide stability for roll-on design.

12. The enclosure set forth in claim 10, wherein said enclosure has an elastic 'fitted bed sheet' front such that said enclosure can be unrolled and stretched over the typical golf cart roof front to secure the enclosure onto the golf cart roof.

13. The portable enclosure of claim 10, wherein the rear wind panel covers the rolled-up enclosure to serve as an outer storage cover.

14. The portable enclosure of claim 10, wherein the rear windpanel has attachment straps used to secure the rear windpanel, when installed on a golf cart, alternatively connects to attachment hooks to secure the enclosure in a self-contained roll for storage and future installation.

* * * * *